United States Patent [19]

Kumasaka et al.

[11] Patent Number: 5,008,691

[45] Date of Patent: Apr. 16, 1991

[54] MULTI-COLOR ELECTROPHOTOGRAPH APPARATUS

[75] Inventors: Takao Kumasaka, Takahagi; Yuzuru Simazaki, Hitachi, both of Japan

[73] Assignees: Hitachi, Ltd.; Hitachi Koki Co., Ltd., both of Tokyo, Japan

[21] Appl. No.: 407,859

[22] Filed: Sep. 15, 1989

[30] Foreign Application Priority Data

Sep. 21, 1988 [JP] Japan ................................ 63-234999

[51] Int. Cl.[5] ............................................ G01D 15/00

[52] U.S. Cl. .................................................... 346/157

[58] Field of Search .................. 358/75; 346/157, 210, 346/218, 256, 326, 328

[56] References Cited

U.S. PATENT DOCUMENTS

| | | | |
|---|---|---|---|
| 4,398,817 | 8/1983 | Nishimura et al. | 355/326 |
| 4,837,591 | 6/1989 | Snelling | 346/157 X |
| 4,860,048 | 8/1989 | Itoh et al. | 346/157 X |
| 4,862,216 | 8/1989 | Higashi et al. | 355/218 |

FOREIGN PATENT DOCUMENTS

| | | |
|---|---|---|
| 52-106743 | 7/1977 | Japan . |
| 59-46655 | 3/1984 | Japan . |
| 61-117574 | 6/1986 | Japan . |

*Primary Examiner*—Donald A. Griffin
*Attorney, Agent, or Firm*—Kenyon & Kenyon

[57] ABSTRACT

In a multi-color LBP (laser beam printer) or a full-color LBP, two image producing elements each composed of charge-exposure-develop devices are arranged around one drum, and each of the image producing elements includes a developer capable of color changing for achieving a color change developing in every one revolution. In this way, it is made possible to practice a multicolor printing or a full-color printing in two rotations of one photosensitive drum. This printer has a higher printing speed and a smaller size of the apparatus in comparison with that of a one drum four rotation system and that of a one drum one rotation system, respectively. Further, the system includes several features common to two-color LBP printing art, making it possible to conveniently utilize the latter printing art.

24 Claims, 4 Drawing Sheets

MULTI-COLOR ELECTROPHOTOGRAPH APPARATUS

TECHNICAL FIELD

The present invention relates to an electrophotograph apparatus, and in particular, to a multi-color electrophotograph apparatus using multi-color toners for developing an electrostatic latent image.

The inventors, Kumasaka et al., have filed U.S. patent application Ser. No. 353,753 filed May 17, 1989 now U.S. Pat. No. 4,947,200 issued Aug. 7, 1990, directed to a multi-color recording apparatus including a developing device for developing an electrostatic latent image with a toner developer agent.

RELATED ART

As a conventional printing process for a multicolor LBP (Laser Beam Printer) or a full-color LBP using four colors of magenta, cyan, yellow, and black, there has been proposed a one drum four rotation system, a one drum one rotation system, or a four drum system. These systems are disclosed, for example, in Japanese Patent Laid-open No. 52-106743, Japanese Patent Laid-open No. 61-117574, or Japanese Patent Laid-open No. 59-46655.

However, in the one drum four rotation system, it is difficult to obtain a rapid printing speed, because four rotations of a photosensitive drum are required. In the one drum one rotation system, the diameter of the photosensitive drum becomes greater, because four sets of charge-exposure-develop devices are required to be arranged. And, in the four drum system, the size of the apparatus as a whole becomes greater, because four photosensitive drums are required.

SUMMARY OF THE INVENTION

The object of the present invention is to provide a multi-color electrophotograph apparatus which overcomes the above-mentioned disadvantages of the related art, as well as having well-balanced excellent features relating to both the performance (printing speed) and the volume of the apparatus.

The above-mentioned object can be achieved by providing two sets of image producing means composed of charge-exposure-develop devices arranged around a photosensitive drum and providing the developing means with a color change function for obtaining a multi-color printing in at most two rotations of the photosensitive drum. This means that a two color printing can be achieved in one rotation of the photosensitive drum.

In the one drum two rotation system according to the present invention, the printing speed is increased to double or the number of image producing means is decreased to half in comparison with the one drum four rotation system or the one drum one rotation system of the related art, respectively. As a consequence, the apparatus of the present invention has well-balanced excellent features relating to both the performance (printing speed) and the volume of the apparatus, thereby enabling a multi-color printing having a high printing speed without requiring a large size of the apparatus as a whole.

BRIEF DESCRIPTIONS OF THE DRAWINGS

DETAILED DESCRIPTION OF THE PRESENT INVENTION

Figure 2:
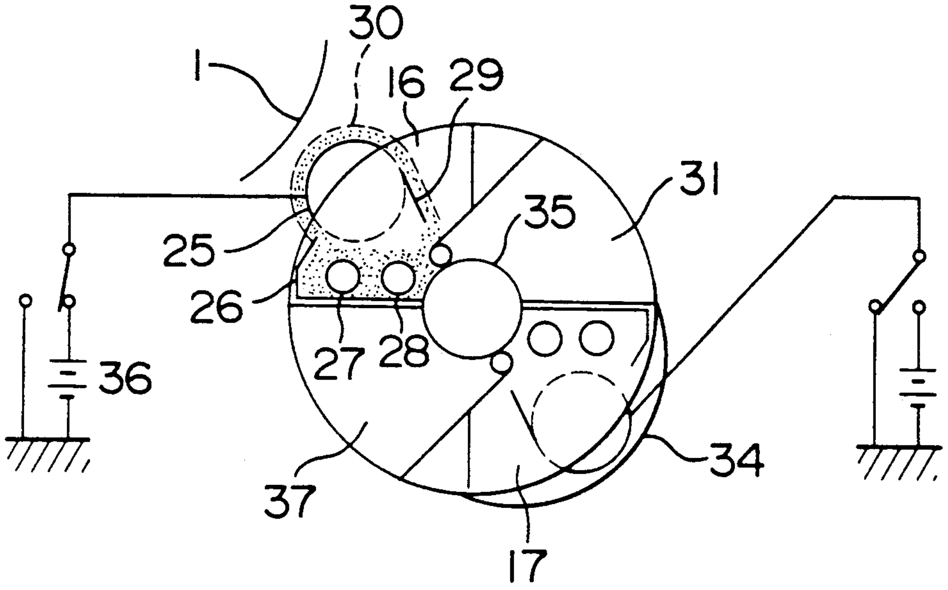
FIGS. 2 and 3 show a rotary developing device used in the first embodiment of the present invention.
Figure 3:
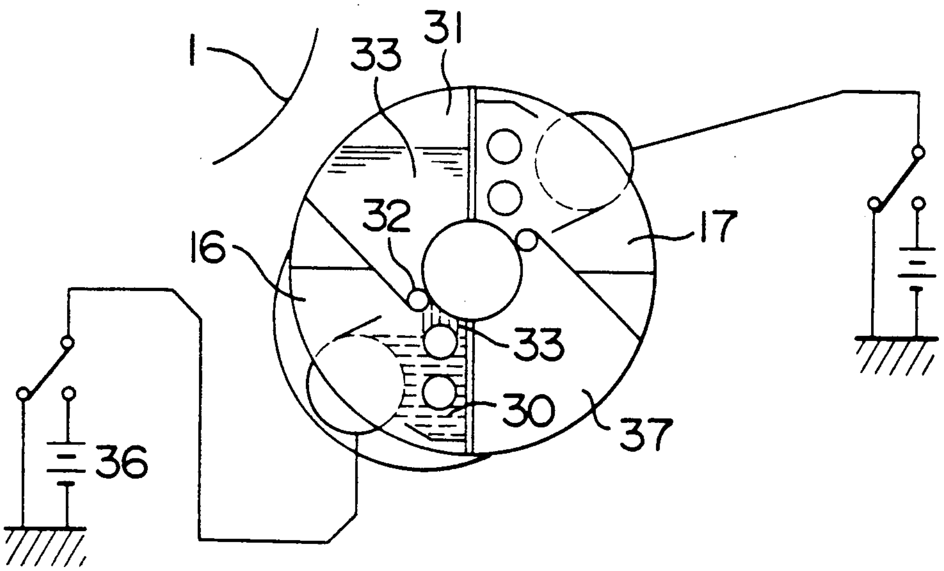

The first embodiment of the present invention will be described below by referring to FIGS. 1–3. The multicolor electrophotograph apparatus according to the present invention includes first image producing means having the first charging section 2, the first exposure section 3 and the first developing section 4 arranged around a photosensitive drum 1, and the second image producing means having the second charging section 5, the second exposure section 6 and the second developing section 7 similarly arranged around the photosensitive drum 1. Each of the first and second developing sections 4 and 7 includes two color toners and comprises rotary developing devices composed of developing elements 16, 17, 18 and 19. The rotary developing device will be described in detail by referring to FIGS. 2 and 3. FIG. 2 shows the rotary developing device at a rotational position corresponding to a developing mode, while FIG. 3 shows the same at a rotational position corresponding to a toner supply mode. In the developing mode, as shown in FIG. 2, a developer agent 30 is agitated by agitators 27 and 28, carried to the vicinity of a developing roll 25 and then attracted to the developing roll by means of a magnet contained therein. The amount of the developer agent 30 attracted to the developing roll is adjusted to a predetermined value by means of a adjusting plate 26. Thus, the developer agent 30 is transferred to the developing section located opposite to the photosensitive drum 1, and a latent image on the photosensitive drum 1 is developed with toner 33 by applying a predetermined bias voltage 36 on the developing roll. Developer agent layer 30 and the photosensitive drum 1 are preferred to be so located as to have a gap therebetween in a non-contact positional relation, as shown in the figure. In the toner supply mode, as shown FIG. 3, a toner supply element 31 is disposed above a developing element 16, and toner 33 is supplied into the developing element by rotating a toner supply roll having surface irregularity or notches. The bias voltage on the developing roll is desired to be cut off as shown in the figure.

The multi-color electrophotograph apparatus according to the present invention includes developing elements 16, 17, 18 and 19 recommending to four colors, black, magenta, cyan and yellow, and accommodated in rotary developing sections 4 and 7 and a cleaner 13. In the process of producing a four-color toner image in two rotations of the photosensitive drum 1, no member is allowed to contact with the photosensitive drum 1 for protecting the toner image from being disturbed or scraped. For this purpose, cleaner 13 is adjustably separated from the photosensitive drum 1 by means of a cleaner control device 24. Cleaner 13 is adapted to again contact with the photosensitive drum 1, just after the toner image has been transferred on a paper in transfer section 11.

In these arrangements, four-color printing or full-color printing produced by laying four colors one over the other can be obtained by arranging two sets of image producing means composed of chargeexposure-develop devices and rotating the photosensitive drum by two rotations. As a result it is possible to achieve a multi-color printing at high printing speed and the size of the apparatus can be decreased.

Figure 4:
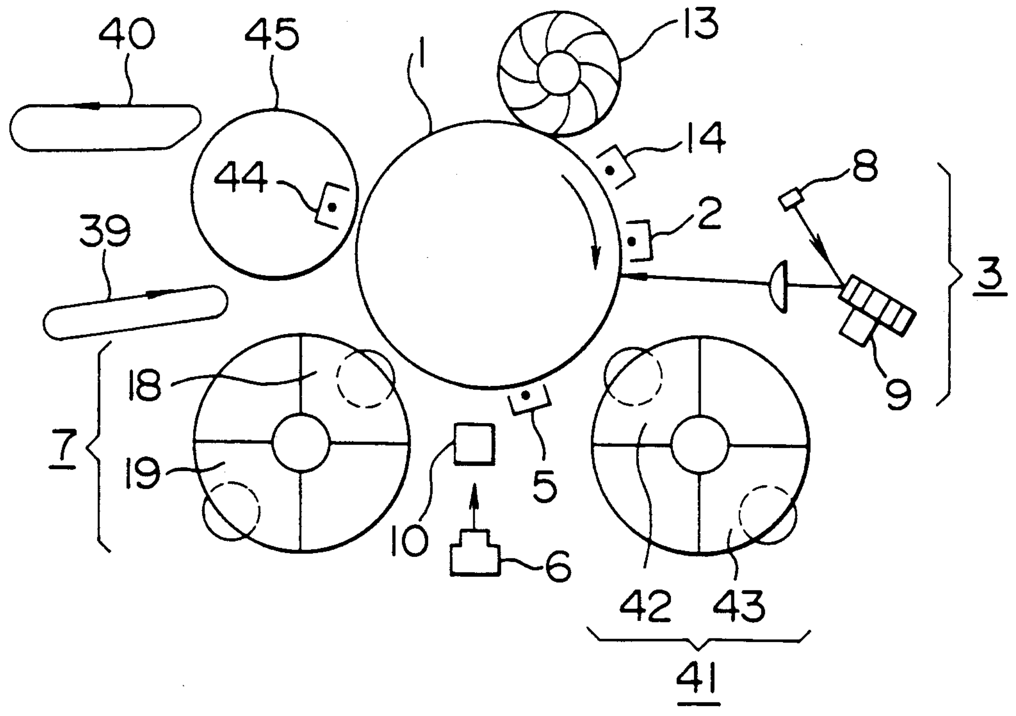
FIG. 4 shows a second embodiment of the present invention.
Figure 5:
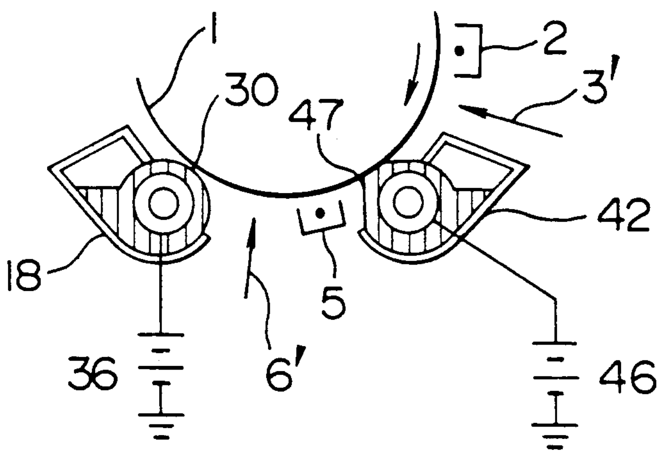
FIG. 5 is an enlarged detail of FIG. 4.

FIG. 4 shows a second embodiment according to the present invention. This embodiment is different from that shown in FIG. 1 in that a transferring drum 45 is provided as a transferring device. Transferring drum 45 may be constituted by arranging a corona charging device 44 inside of a dielectric film or a dielectric belt as shown in the figure, or by providing a bias roller applying a bias voltage on a metallic cylinder on which a conductive rubber layer is covered. A four-color toner image is produced by winding a paper on transferring drum 45, and rotating the photosensitive drum 1 twice, whereby, in each one rotation of the photosensitive drum 1, a two-color toner image is transferred on the paper by means of transferring drum 45. In this arrangement, although the size of the apparatus becomes somewhat greater because of the existence of the transferring drum 45, no cleaner control device 24 is required, because a toner image on the photosensitive drum is transferred in every rotation thereof and accordingly, cleaner 13 is allowed to contact with the photosensitive drum at all times. Furthermore, the first developing means is not necessarily required to be of a non-contact type, but, as shown in FIGS. 4 and 5, a rotary developing device 41 having a contact developing element 42 may be provided as a first developing device. A contact type developing method has an advantage in that a more precise developing is possible in comparison with a non-contact type developing method.

Figure 1:
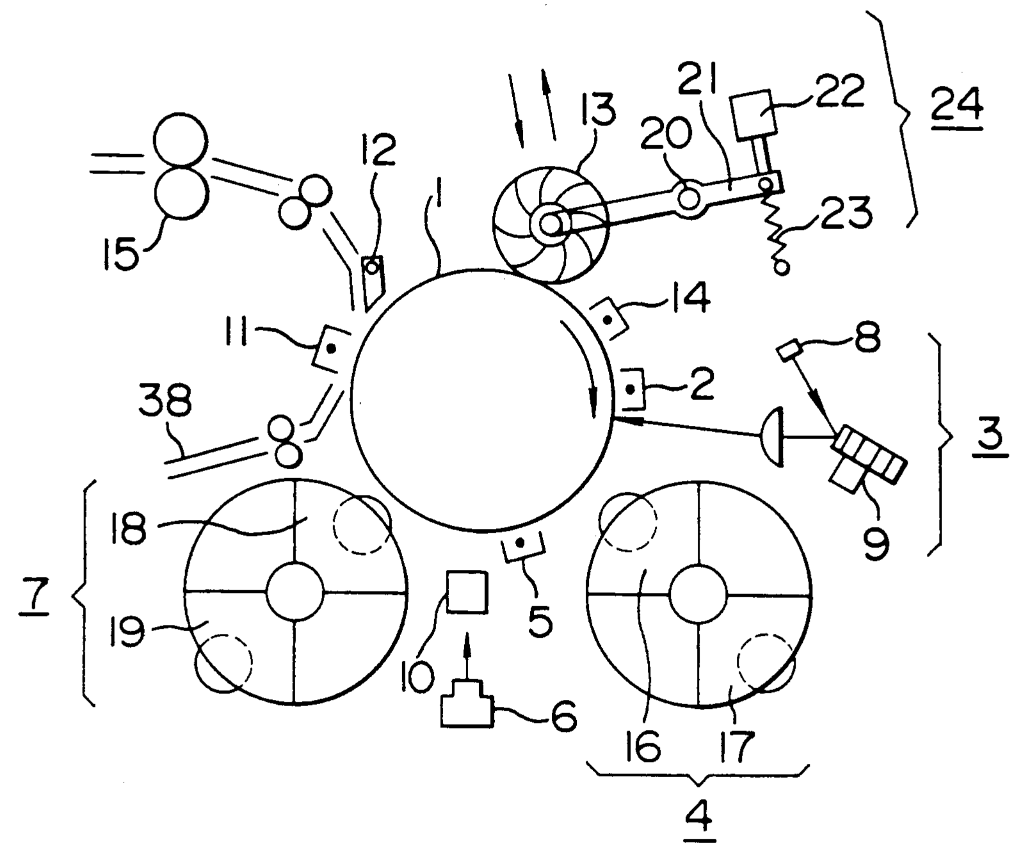
FIG. 1 shows a first embodiment of the present invention.
Figure 6:
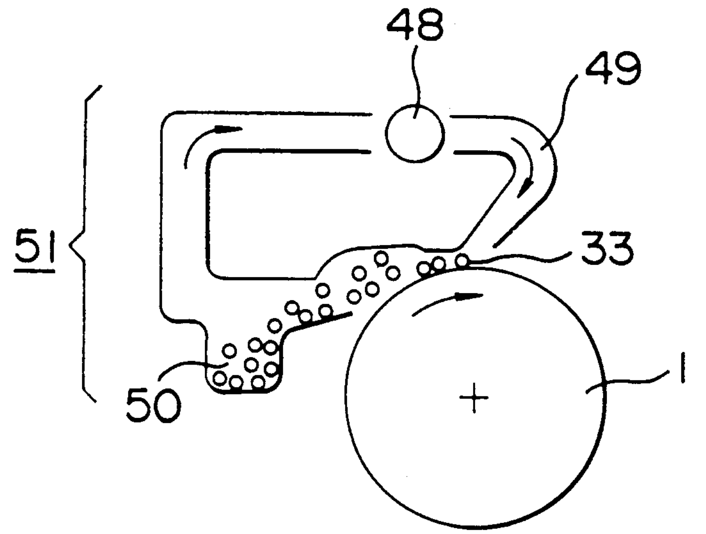
FIGS. 6 and 7 show cleaners of a non-contact type used in the present invention.
Figure 7:
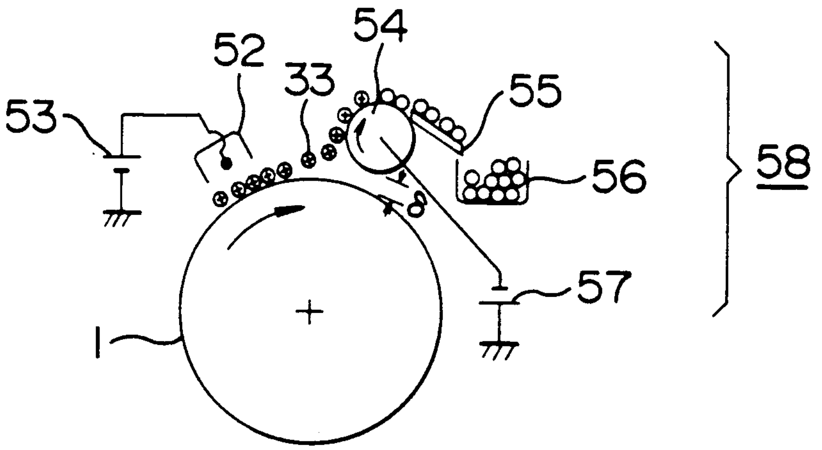

FIG. 6 and FIG. 7 relate to improvements for members used in the embodiment shown in FIG. 1, FIG. 6 shows a cleaner of air knife type and FIG. 7 illustrates an electrostatically biased cleaning roll, respectively. In the example shown in FIG. 6, toner image 33 is removed in a non-contact manner and recovered into a recovering section 50 by blowing air against photosensitive drum 1. She cleaner includes a piping 49 and a blower 48. In the example shown in FIG. 7, toner 33 is charged by means of a charging device 52 and attracted in a non-contact manner by a biased cleaning roller 54 disposed opposite to the photosensitive drum 1 with a very little gap 6 therebetween, thereby achieving a cleaning. These cleaning devices of non-contact type have an advantage that no cleaner control means is required.

Figure 8:
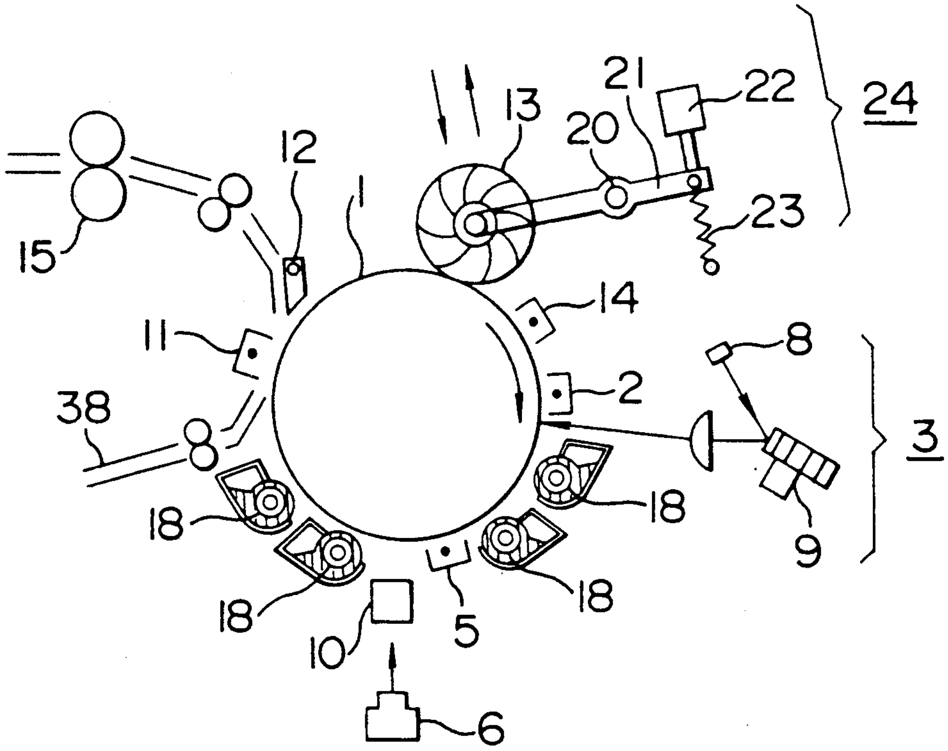
FIG. 8 shows a third embodiment of the present invention.

Further, although, in the examples shown in FIG. 1 and FIG. 4, a rotary developing device is used, two single-color developing devices of non-rotary type may be disposed side by side in place of the one rotary developing device as shown in the third embodiment in FIG. 8.

The present invention has advantages in that it is possible to achieve a multi-color printing a high printing speed and the size of the apparatus can be decreased, because a four-color printing or a full-color printing can be obtained by arranging two sets of image producing means composed of charge-exposure-develop devices and rotating the photosensitive drum by two rotations.

What is claimed is:

1. A multi-color electrophotograph apparatus comprising:

a photosensitive drum;

a first means for producing an image, disposed in proximity to said photosensitive drum, said first means comprising;

a first charging element;

a first exposure station; and a first developer; and a second means for producing an image, disposed in proximity to said photosensitive drum, said second means comprising, a second charging element;

a second exposure station, and a second developer;

wherein at least one of said first and second developers has a two-color change function, and a multi-color printing operation is carried out in at most two rotations of said photosensitive drum.

2. The multi-color electrophotograph apparatus of claim 1 wherein said at least one of said first and second developers having a two color change function is a rotary developing device.

3. The multi-color electrophotograph apparatus of claim 2, further comprising a transferring drum wherein a toner image on said photosensitive drum is transferred to a paper mounted on said transferring drum in every rotation thereof.

4. The multi-color electrophotograph apparatus of claim 3, wherein said first developer performs contact developing.

5. The multi-color electrophotograph apparatus of claim 1, wherein said at least one of said first and second developers having a two-color change function comprises a plurality of developing devices of non-rotary type.

6. The multi-color electrophotograph apparatus of claim 5, further comprising a transferring drum wherein a toner image on said photosensitive drum is transferred to a paper mounted on said transferring drum in every rotation thereof.

7. The multi-color electrophotograph apparatus of claim 6, wherein said first developer performs contact developing.

8. The multi-color electrophotograph apparatus of claim 1, further comprising a transferring drum wherein a toner image on said photosensitive drum is transferred to a paper mounted on said transferring drum in every rotation thereof.

9. The multi-color electrophotograph apparatus of claim 8, wherein said first developer performs contact developing.

10. The multi-color electrophotograph apparatus of claim 1, wherein said first and second developers perform non-contact developing.

11. The multi-color electrophotograph apparatus of claim 1, further comprising a cleaner control device moving a drum cleaner toward or away from said photosensitive drum.

12. The multi-color electrophotograph apparatus of claim 1, further comprising a drum cleaner of a non-contact type.

13. The multi-color electrophotograph apparatus of claim 1, wherein said first and second developer comprise rotary developing devices.

14. The multi-color electrophotograph apparatus of claim 1, wherein said apparatus is used for computer terminal, personal computer, work processor, PPCFAX, work station printer, or color duplicator.

15. A multi-color electrophotograph apparatus comprising:

a photosensitive drum;

a first imaging device producing a first image on said photosensitive drum, said first imaging device comprising, a first charging element, a first exposure element; and a first developer;

a second imaging device producing a second image on said photosensitive drum, said second imaging device comprising, a second charging element;

a second exposure element;

a second developer; and means for transferring an image from said photosensitive drum to a print medium, wherein at least one of said first and second developers has a two-color change function, and a multicolor printing operation is carried out in at most two rotations of said photosensitive drum.

16. The apparatus of claim 15 further comprising a drum cleaner cleaning said photosensitive drum.

17. The apparatus of claim 16, further comprising a cleaner controller selectively moving said cleaner into position for cleaning said photosensitive drum.

18. The apparatus of claim 15, wherein said means for transferring comprises a transferring drum wherein a toner image on said photosensitive drum is transferred to said print medium which is mounted on said transferring drum in each rotation of said photosensitive drum.

19. The apparatus of claim 18 further comprising a drum cleaner cleaning said photosensitive drum.

20. The apparatus of claim 19 wherein said cleaner cleans said photosensitive drum during each rotation of said photosensitive drum.

21. The multi-color electrophotograph apparatus of claim 15, wherein said at least one of said first and second developers having a two color change function is a rotary developing device.

22. The multi-color electrophotograph apparatus of claim 15, wherein said at least one of said first and second developers having a two-color change function comprises a plurality of developing devices of non-rotary type.

23. A method for producing a multi-color electrophotograph image comprising the steps of:

a. rotating a photosensitive drum;

b. at a first station, producing a first image on said photosensitive drum at a first location;

c. at a second station, producing a second image on said photosensitive drum at said first location;

d. at least one of said first and second stations changing a color of an image to be produced at the corresponding station;

e. transferring images from said first location on said photosensitive drum to a print medium;

wherein said images are transferred to said print medium during a first rotation of said photosensitive drum and further comprising the steps of cleaning said photosensitive drum;

at said at least one station, changing the color of an image during a second rotation of said photosensitive drum;

producing a third image on said photosensitive drum during said second rotation; transferring said third image to said print medium during said second rotation.

24. A method for producing a multi-color electrophotograph image comprising the steps of:

a. rotating a photosensitive drum;

b. at a first station, producing a first image on said photosensitive drum at a first location;

c. at a second station, producing a second image on said photosensitive drum at said first location;

d. at least one of said first and second stations changing a color of an image to be produced at the corresponding station;

e. transferring images from said first location on said photosensitive drum to a print medium;

wherein said step of transferring occurs after two rotations of said photosensitive drum and after said at least one of said stations changes the color of the image to be produced at that at least one station.

* * * * *

UNITED STATES PATENT AND TRADEMARK OFFICE

CERTIFICATE OF CORRECTION

PATENT NO. : 5,008,691

DATED : April 16, 1991

INVENTOR(S) : Takao Kumasaka et al

It is certified that error appears in the above-identified patent and that said Letters Patent is hereby corrected as shown below:

| Column | Line | |
|---|---|---|
| 2 | 42 | Change "a" to --an--. |
| 2 | 51 | After "shown" insert --in--. |
| 2 | 59 | Change "recommending" to --corresponding--. |
| 3 | 7 | Change "chargeexposure" to --charge-exposure--. |
| 3 | 47 | Change "She" to --The--. |
| 3 | 52 | Change "gap 6" to --gap $\delta$--. |
| 3 | 63 | After "printing" insert --,--. |
| 5 | 1 | Change "work" to --word--. |
| 6 | 25 | Before "transferring" start new paragraph. |

Signed and Sealed this

Seventeenth Day of November, 1992

*Attest:*

DOUGLAS B. COMER

*Attesting Officer*

*Acting Commissioner of Patents and Trademarks*